L. ZEYEN.
Pulp-Strainer.
No. 226,819.  Patented April 20, 1880.
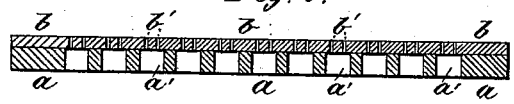
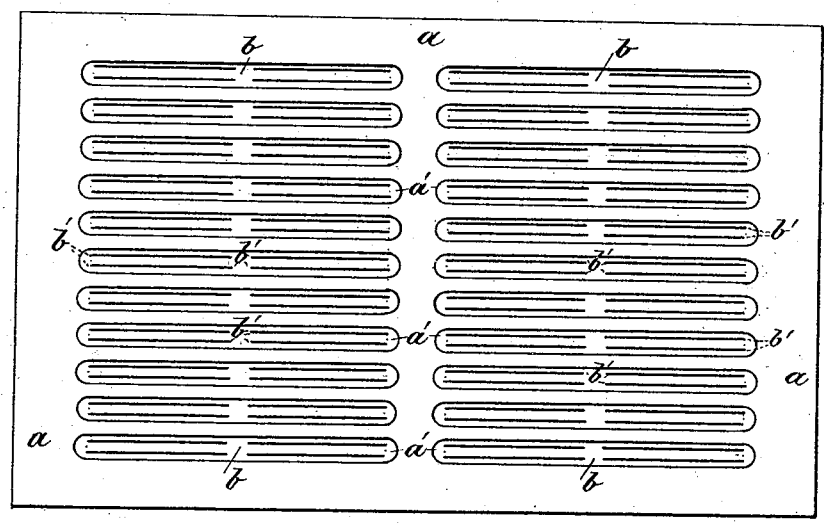
Witnesses
G. B. Towles.
Henri Guillaume
Inventor
Leopold Zeyen
pr Henry Orth
atty.

UNITED STATES PATENT OFFICE.

LEOPOLD ZEYEN, OF RAGUHN, ANHALT, GERMAN EMPIRE.

PULP-STRAINER.

SPECIFICATION forming part of Letters Patent No. 226,819, dated April 20, 1880.

Application filed January 29, 1880.

*To all whom it may concern:*

Be it known that I, LEOPOLD ZEYEN, resident of Raguhn, Dukedom of Anhalt, German Empire, doing business under the firm of Gottlieb Heerbrandt, have invented new and useful Improvements in Pulp-Strainers, of which the following is a specification.

My invention has for its object to cheapen the construction of pulp-strainers and facilitate their handling and cleaning; and to that end the invention consists in constructing the strainers in sections and laying them upon a supporting plate or backing having slits or pulp-passages of greater diameter than those of the strainer.

Pulp-strainers, as heretofore constructed, consisted of a single metallic plate provided with a series of rows of slits or pulp-passages which necessitated the removing of the whole plate or strainer when some of the passages became choked.

Another great disadvantage, involving great expense, lies in the fact that when some of the slits or passages of one of the series become enlarged from wear a new strainer has to be substituted.

It is evident that by forming the strainer in sections, supported upon a common backing, these defects are remedied.

In the accompanying drawings, Figure 1 is a plan view, and Fig. 2 a section, of my improved pulp-strainer.

In these drawings, $a$ represents a plate, of any suitable material, preferably metal, provided with a series of wide longitudinal apertures, $a'$, said plate serving as a support or backing for the strainer proper. This strainer consists of a series (preferably two or four) of plates or strainers, $b$, provided with the usual series of slits or pulp-passages $b'$. The strainers, being laid upon the backing plate or grating $a$, require no further fastening, being kept in proper position by the pressure of the pulp.

If it becomes necessary to clean the strainer or any portion thereof, the strainer-plates may be removed one by one, cleaned, and replaced in position with ease and facility, and if only a portion of the strainer needs cleaning that section may be removed without disturbing the remaining sections.

By means of this construction I am also enabled to employ strainers the sections of which have pulp-passages of varying degrees of fineness or of varying diameter upon the same grating, the sections being thus made interchangeable.

From what has been said above it will be understood by all those conversant with this branch of the arts that a great saving in the first cost of such strainers, as well as in the cost of their subsequent repair, is effected.

I am aware that pulp-strainers which had become worn have been employed as backing-plates by widening their slits or apertures to utilize them in conjunction with a new strainer, and I do not claim the utilization of a worn strainer-plate by widening its pulp-passages and utilizing such plate as a backing.

What I claim, and desire to secure by Letters Patent, is—

1. A pulp-strainer composed of a series of sectional strainer-plates laid upon a backing plate or grating, as and for the purposes set forth.

2. A pulp-strainer consisting of a series of strainer-plates having pulp-passages of varying diameters laid upon a grating or backing plate having pulp-passages of greater diameter than that of the strainer-plates, substantially as and for the purposes specified.

In witness that I claim the foregoing I have hereunto set my hand this 31st day of December, 1879.

LEOPOLD ZEYEN.

Witnesses:
RICHARD SAEMANN,
WILHELM MARTHGRAF.